United States Patent [19]
Reimann et al.

[11] Patent Number: 4,843,467
[45] Date of Patent: Jun. 27, 1989

[54] METHOD AND APPARATUS FOR IMPROVING THE PICTURE QUALITY IN MULTI-DIMENSIONAL DIFFERENTIAL PULSE CODE MODULATION

[75] Inventors: Udo Reimann, Munich; Werner Liegl, Schwabhausen, both of Fed. Rep. of Germany

[73] Assignee: Siemens Aktiengesellschaft, Berlin and Munich, Fed. Rep. of Germany

[21] Appl. No.: 201,394

[22] Filed: May 24, 1988

Related U.S. Application Data

[63] Continuation of Ser. No. 795,311, Nov. 5, 1985, abandoned.

[30] Foreign Application Priority Data

Nov. 6, 1984 [DE] Fed. Rep. of Germany ....... 3440517

[51] Int. Cl.$^4$ ............................................. H04N 7/13
[52] U.S. Cl. .................................... 358/135; 358/13; 358/141
[58] Field of Search ............... 358/135, 136, 133, 160, 358/166, 141, 142, 13, 12

[56] References Cited

U.S. PATENT DOCUMENTS 4,665,436  5/1987  Osborne .............................. 358/135

OTHER PUBLICATIONS

Digital Television Bandwidth Reduction and Communications Aspects, by R. H. Stafford, published by John Wiley & Sons, 1980, pp. 30–58.
Techniques of DPCM Picture Coding for RPV TV, by R. Lippmann, ICC '79 Conference Record, vol. 3 of 4, Jun. 10–14, 1979, pp. 52.4.1 to 52.4.5.

*Primary Examiner*—Tommy P. Chin
*Attorney, Agent, or Firm*—Hill, Van Santen, Steadman & Simpson

[57] ABSTRACT

A method and apparatus for improving picture quality in multi-dimensional differential pulse code modulation coding wherein at the receiver at the end of an active picture line AZ reconstructed samples $C_r$ are expanded by utilizing auxiliary samples $H_c$ which are allocated to the blanking interval AL and the same auxiliary samples $H_c$ are utilized for encoding at the transmitter of the data. The method and apparatus substantially improves the picture quality by utilizing the techniques of the invention.

5 Claims, 3 Drawing Sheets

FIG 4

| | $B_r$ | $C_r$ | $D_A$ |
|---|---|---|---|
| ∘ | $H_r$ | $I_r$ | $J_A$ |
| ∘ | $A_r$ | $X_r$ | |
| ∘ | $E_r$ | $F_r$ | $G_A$ |
| | AZ | | AL |

FIG 5

| | | $s_{n-1}$ | $s_n$ | $H_s(s_n)$ |
|---|---|---|---|---|
| ∘ | ∘ | $B_r \rightarrow$ | $C_r$ | $H_c(C_r)$ |
| ∘ | ∘ | $A_r \rightarrow$ | $X_r$ | |
| | | AZ | | AL |

FIG 6

| $s_{n-1}$ | $s_n$ | $N_A$ |
|---|---|---|
| $B_r$ | $C_r$ | $N_A$ |
| $A_r$ | $X_r$ | |
| AZ | | AL |

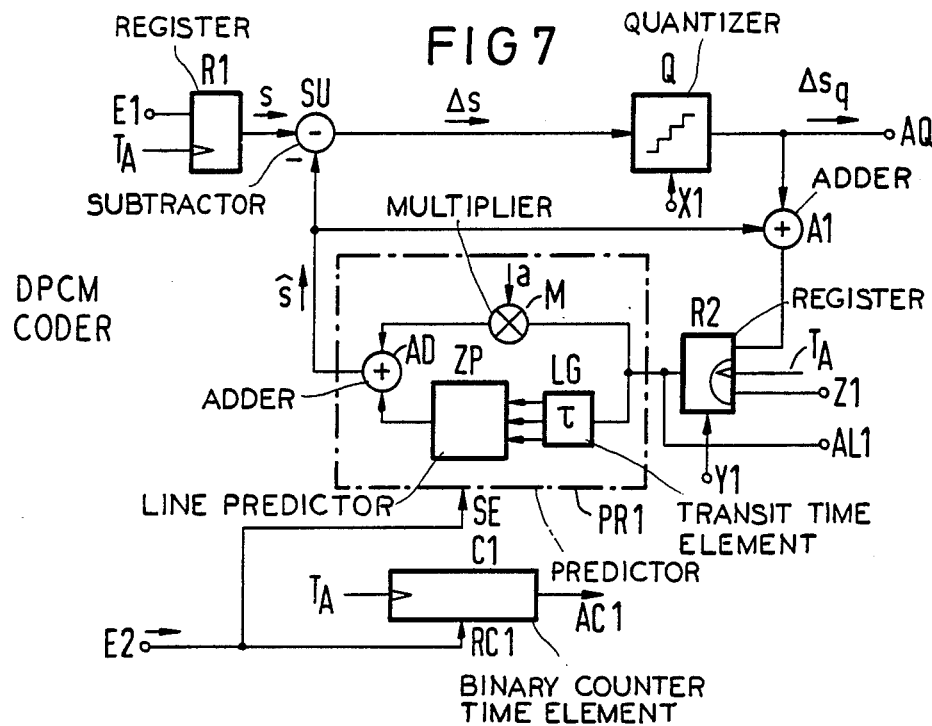
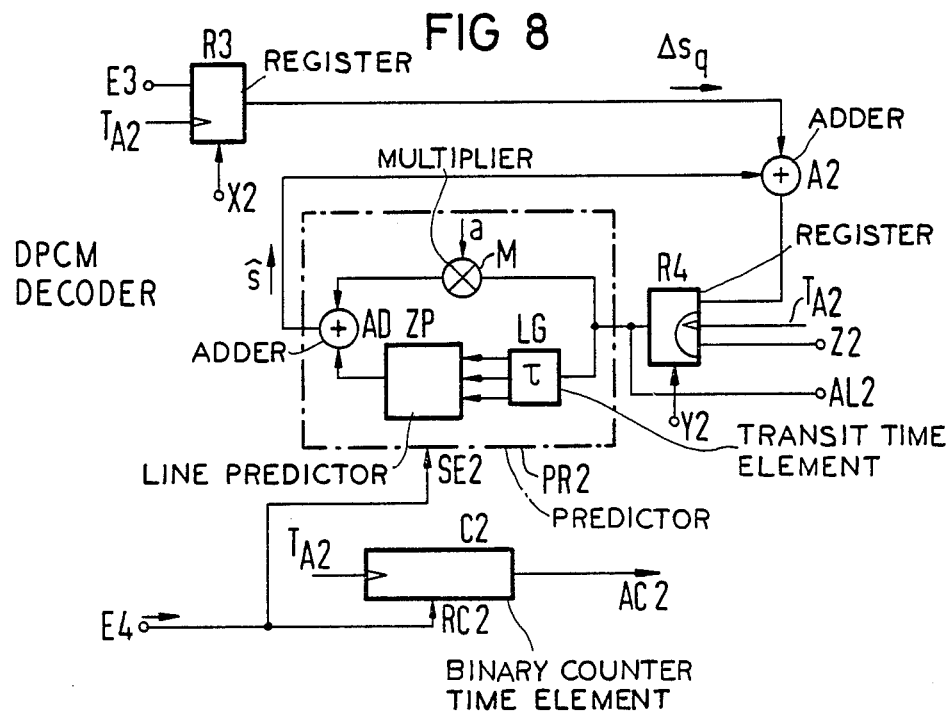

METHOD AND APPARATUS FOR IMPROVING THE PICTURE QUALITY IN MULTI-DIMENSIONAL DIFFERENTIAL PULSE CODE MODULATION

This is a continuation of application Ser. No. 795,311 filed Nov. 5, 1985 now abandonment.

BACKGROUND OF THE INVENTION

1. Field of the Invention

This invention relates in general to a method and apparatus for improving the picture quality in differential pulse code modulation transmitting systems and in particular to method and apparatus for producing reconstructed samples which utilize auxiliary samples associated with the blanking interval at both the receiver and the transmitter.

2. Description of the Prior Art

Differential pulse code modulation (DPCM) is utilized in the transmission of video signals for reducing the data rate. Such DPCM systems are disclosed in the book entitled "Digital Television" by R. H. Stafford, published by John Wiley & Sons (1980), at pages 30 through 58. The DPCM coder calculates an estimated value of data from the neighboring samples of a current sample of data and compares this estimated value to the present sample and outputs the quantitized difference between these two values as DPCM signal value. The receiver reconstructs the samples using the received quantized DPCM signal values. So as to keep the quantitized error from resulting in too large an error between the reconstructed samples and the original samples, the DPCM coder at the transmitter using a DPCM method is constructed such that a recursive DPCM decoder is contained therein, in other words, the same estimated values are used at the transmitter as well as the receiver. The recursive apparatus also assures that the mean value of the quantitized value is zero.

In multi-dimensional DPCM, X samples adjacent the current sample are utilized for calculating the estimated value $\hat{s}$. In two dimensional DPCM the sample A which preceded the current sample, the sample B of the preceding picture line which lies directly above the sample A and samples C and D following are frequently employed as the neighboring samples. In three dimensional DPCM coding, the neighboring samples of the preceding picture or field are also utilized.

The codings of the last DPCM value of a picture line and the reconstruction at the receiver of the last sample of a picture line are problemmatical because only the DPCM values of the scanning values (picture points) of the active lines are transmitted to the receiver. The DPCM values $\Delta s$ for scanning values already falling into the blanking gap are not available to the receiver and must be replaced by an optional value. Thus, the effect of this error in reconstructive scanning values also extends into the succeeding active picture lines since the scanning value is also used in the reconstruction of scanning values of the next picture line and so forth according to the picture content. This error results from the use of different estimated values at the transmitting and receiving locations.

SUMMARY OF THE INVENTION

It is an object of the present invention to provide a method and apparatus for improving the picture quality in multidimensional DPCM coding.

A feature of the present method and apparatus for improving picture quality in multi-dimensional DPCM coding of video signals in which at least one scanning value of a preceding picture line follows the current scanning value and is used for calculating an estimated value and the associated DPCM value at the receiver with the last reconstructed scanning values $C_r$ supplemented by additional auxiliary scanning values Ac assigned to the blanking gap after the end of an active picture line and wherein individual scanning values $X_r$ reconstructed at the end of the next active picture line using such auxiliary scanning values $H_c$... and wherein at the transmitter, the same auxiliary scanning values $H_c$... are used for encoding.

Another object of the present invention is to provide at the receiver after the DPCM values of each active picture line have been processed at least one DPCM value of zero is used to calculate the auxiliary scanning values and at the transmitter the same DPCM values are used for calculating the same auxiliary scanning values.

Another feature of the present invention is that the reconstructed last scanning values of the active picture line AZ are used as auxiliary scanning values $H_s$, $H_c$... Another feature of the present invention is that a constant value is used for the auxiliary scanning values.

Yet another object of the invention is to provide that the constant value is equal to a mean gray scale value. Yet another object of the invention is to provide that only one single scanning value H is used in each picture line to calculate the last reconstructed scanning value $X_r$ of the active picture line.

In the method of invention the same estimated values are used by agreement at the DPCM decoder and in the DPCM coder when calculating the last DPCM value and reconstructing the last active scanning value. In less common DPCM coding methods where several scanning values are used which fall into the blanking gap to calculate the estimated value, the invention applies the technique and method to the appropriate number of estimated values at the end of a picture line.

Exact synchronism between the DPCM decoder and the DPCM coder is achieved by setting the quantitized DPCM values to zero. Also, the same values can be used in normal multidimensional DPCM coding for the first scanning value on the blanking gap and for the last scanning value on the active picture line. The synchronism between the DPCM decoder and the DPCM coder may also be achieved by feeding the same auxiliary scanning value for calculating the last reconstructed scanning value or the last DPCM value into the appropriate prediction device.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 4 illustrates a possible selection of adjacent scanning values for calculating the estimated value in three dimensional DPCM;

FIG. 5 illustrates a reconstructed scanning value at the end of the picture line;

FIG. 6 illustrates reconstructed scanning values using constant auxiliary scanning values; FIG. 7 illustrates a DPCM coder according to the invention; and FIG. 8 illustrates a DPCM decoder according to the invention.

DESCRIPTION OF THE PREFERRED EMBODIMENTS

Figure 1:
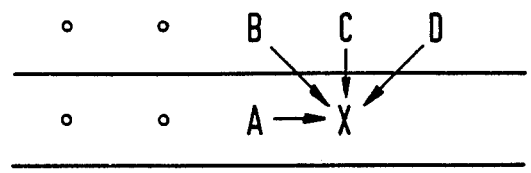
FIG. 1 illustrates an example of possible selection values of adjacent scanning values for calculating an estimated value.

The method and apparatus will be explained with reference to a two dimensional DPCM coding method. FIG. 1 illustrates the scanning values or picture points of two consecutive picture lines as, for example, television scanning lines. In the first picture line illustrated, these are the scanning values BCD and in the next picture line commencing directly below the scanning value B scanning values A and X. The scanning value X in question is normally digitized and transmitted to the DPCM coder as a data word and is compared with the estimated value ŝ, which is determined by means of the adjacent scanning values, A, B, C and D. Quantitized DPCM value $\Delta s_q$ formed from the estimated value and the scanning value under consideration is transmitted to the receiver.

The DPCM decoder attempts to reconstruct the original scanning value from the quantitized DPCM values. However, because of the quantitization errors, the reconstructed scanning values deviate slightly from the original scanning values.

Figure 2:
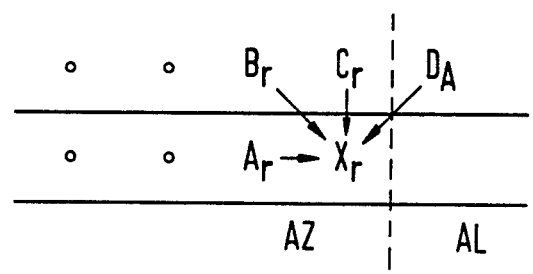
FIG. 2 shows a reconstructed scanning value at the end of a picture line.

FIG. 2 illustrates the last reconstructed scanning values of two consecutive picture lines. Difficulties are encountered in constructing the last current scanning value $X_r$ because there is no reconstructed scanning $D_r$ in the blanking gap AL because the corresponding DPCM value is not transmitted. The last DPCM value of a picture line transmitted was formed utilizing the last scanning values A, X, B and C of the active picture line AZ and a further scanning value D already in the blanking gap. If the scanning value D is replaced by another value at the receiver, this leads initially to an incorrect reconstructed scanning value $X_r$ and hence to an interruption in the synchronization in the DPCM decoder and the DPCM coder.

Figure 3:
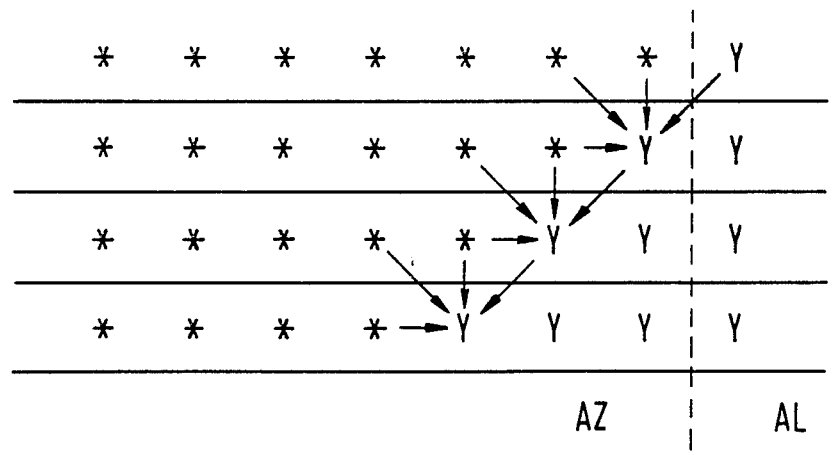
FIG. 3 illustrates the error propagation at the end of a picture line.

FIG. 3 illustrates how the errors are propagated in the case of the prediction algorithm illustrated in FIG. 1. The correct reconstructed scanning values are denoted by an asterisk and incorrectly reconstructed scanning values by Y. In the case of the DPCM coding method used therefore the effect of an error may extend substantially into the subsequent active picture lines during reconstruction as illustrated in FIG. 3.

FIG. 4 illustrates the adjacent estimated values for three dimensional DPCM coding. Estimated values EFG and HIJ belong in this case to the last frame. When reconstructing the last scanning value of a television line, several estimated values $D_A$, $J_A$ and $G_A$ which already fall into the blanking gap AL must therefore be taken into consideration. It is possible in this example, of course, although unusual to use prediction algorithms where more than one estimated value per picture line falls into the blanking gap.

According to the present invention, every first scanning value falling into the blanking gap and similarly any further scanning values falling into the blanking gap are replaced at the receiver and transmitter by agreement by the same reconstructed auxiliary scanning value H, by the last reconstructed scanning values of a picture line $s_n$, $C_r$ or by constant auxiliary scanning values $N_A$ as illustrated in FIGS. 5 and 6.

FIG. 3 illustrates that it is also impossible to avoid incorrectly reconstructed scanning values by transmitting additional DPCM values extending into the blanking gap AL using the prediction algorithms indicated due to the error propagation.

FIG. 7 illustrates a DPCM coder. Digitized scanning values s are transmitted by way of a first input E1 to a first register R1. The output of the register R1 is connected to the input of a subtractor SU which provides its output to the input of a quantitizer Q.

The output AQ of the quantizer Q is connected to the input of a first adder A1 which supplies its output to a second register R2. A first predictor PR1 receives the output of the second register R2 and the predictor PR1 supplies an output to the subtractor SU and also supplies its output to the second input of the first adder A1. The output of the second register R2 forms the so-called output AL1 to which the reconstructed scanning values $s_r$ are transmitted.

The first predictor PR1 contains a multiplier M which receives an input that is connected to the output of the second register R2 and has its output connected to the input of an adder AD. The multiplier M multiplies the input values by a constant factor "a". A series connection of a transit time element LG and a line predictor ZP are connected between the output of the second register R2 and supplies an output from the line predictor ZP to the adder AD. The transit time element LG and line predictor ZP are connected in parallel with the multiplier M. The output of the adder AD forms the output of the first predictor PR1. A binary counter C1 operates as the time element and has its clock element connected to an operating cycle input $T_A$ which indicates the scanning value cycle. The clock input $T_A$ is also supplied to the first and second registers R1 and R2 as illustrated. The output AC1 of the first binary counter C1 is connected either to the setting input X1 of the quantizer Q or to a resetting input Y1 of the second register R2 or to its takeover control input Z1. The binary counter is also provided with a resetting input RC1 to which the line pulse ZI is transmitted by way of an input Terminal E2. The line pulse is also supplied as a setting input SE of the first predictor PR1 and as not illustrated also is supplied as the resetting input of the second register R2. The DPCM coder illustrated in FIG. 7 is provided with a normal circuit arrangement, but the method and apparatus according to the invention may be implemented with coders and decoders of any desired structure.

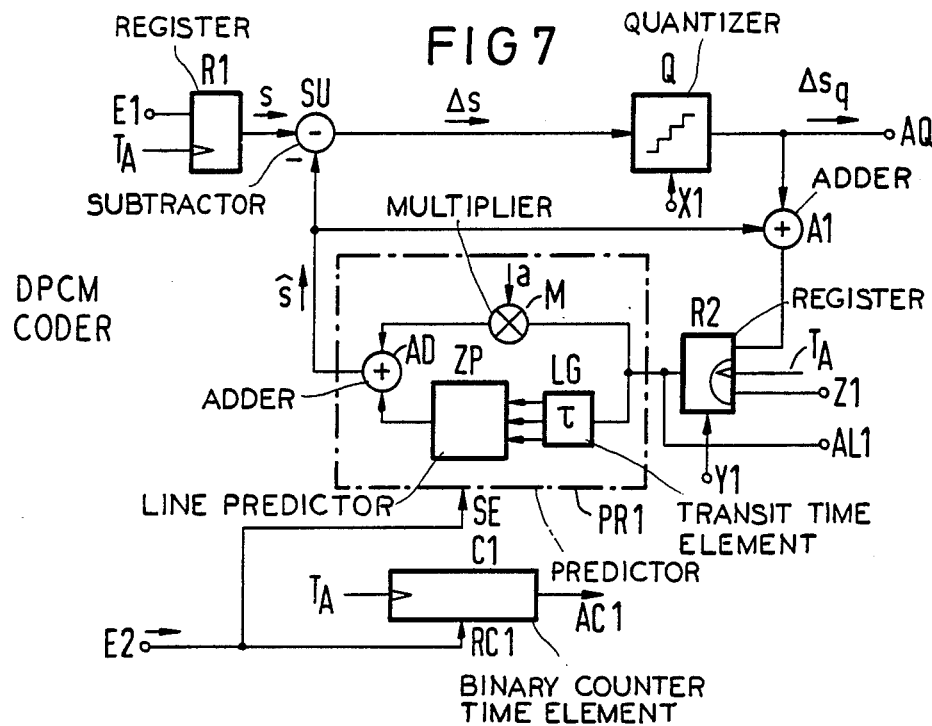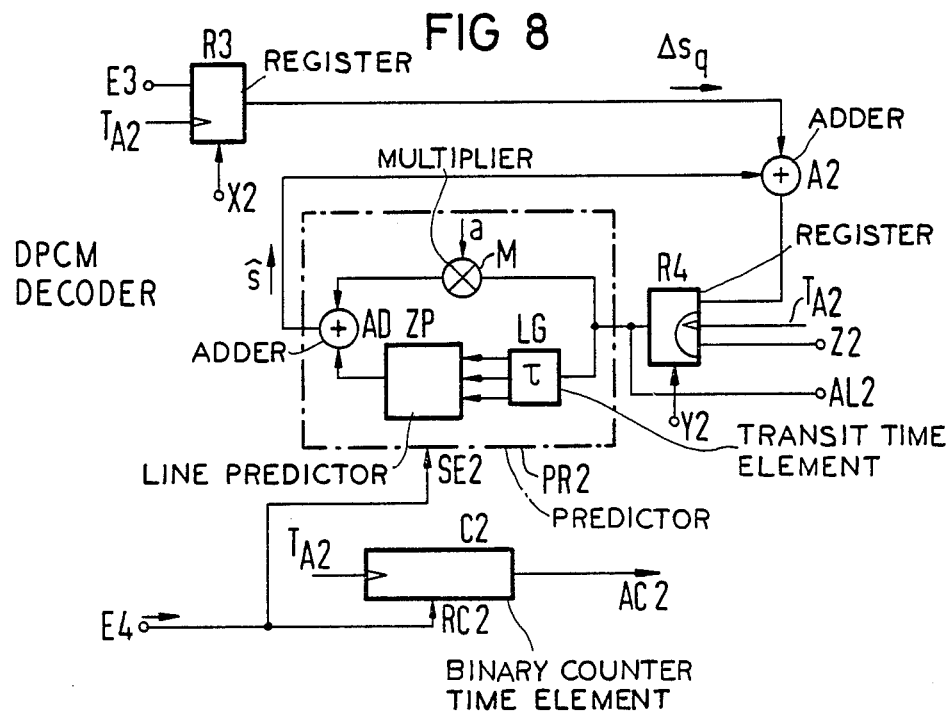

The digitized scanning value s is transmitted to subtractor SU by way of the first register R1. The DPCM signal Δs which is transmitted to the input of the quantizer Q is determined from the difference between s and the estimated value ŝ supplied by the first predictor PR1. The quantized DPCM values $\Delta s_q$ are produced at the output AQ of the quantizer Q and are supplied to the first adder A1. The reconstructed scanning values $s_r$ is determined by adding to the estimated value ŝ at the second adding input and is transmitted to the first predictor PR1 for calculating the next estimated value. The transit time element LG is provided with a variable number of taps depending on the design of the line predictor ZP or contains several transit time elements.